United States Patent
Tateno

(10) Patent No.: US 10,550,730 B2
(45) Date of Patent: Feb. 4, 2020

(54) WASTE HEAT RECOVERY SYSTEM

(71) Applicant: TOYOTA JIDOSHA KABUSHIKI KAISHA, Toyota-shi, Aichi-ken (JP)

(72) Inventor: Manabu Tateno, Suntou-gun (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 38 days.

(21) Appl. No.: 15/937,471

(22) Filed: Mar. 27, 2018

(65) Prior Publication Data

US 2018/0313233 A1 Nov. 1, 2018

(30) Foreign Application Priority Data

Apr. 28, 2017 (JP) ................................. 2017-090106

(51) Int. Cl.
| | |
|---|---|
| *F01K 15/02* | (2006.01) |
| *F01K 23/06* | (2006.01) |
| *F01K 7/16* | (2006.01) |
| *F01D 17/00* | (2006.01) |
| *F01N 5/02* | (2006.01) |
| *F16H 61/02* | (2006.01) |

(52) U.S. Cl.
CPC .............. *F01K 15/02* (2013.01); *F01D 17/00* (2013.01); *F01K 7/16* (2013.01); *F01K 23/065* (2013.01); *F01N 5/02* (2013.01); *F16H 61/0204* (2013.01); *F05D 2270/02* (2013.01); *F05D 2270/3013* (2013.01); *F25J 2240/82* (2013.01)

(58) Field of Classification Search
CPC . F01K 7/16; F01K 13/02; F01K 15/02; F01K 23/065; F01K 23/14; F01D 17/00; F05D 2270/02; F05D 2270/3013; F01N 5/02; F25J 2240/82
See application file for complete search history.

(56) References Cited

U.S. PATENT DOCUMENTS

| | | | |
|---|---|---|---|
| 2003/0115877 A1* | 6/2003 | Bara | ...................... F01K 23/065 60/620 |
| 2013/0219882 A1* | 8/2013 | Jensen | ...................... F01N 5/02 60/604 |
| 2014/0116051 A1* | 5/2014 | Enokijima | .............. F01K 23/10 60/660 |

(Continued)

FOREIGN PATENT DOCUMENTS

| | | |
|---|---|---|
| JP | 2001-227616 A | 8/2001 |
| JP | 2010-242518 | 10/2010 |

(Continued)

*Primary Examiner* — Audrey K Bradley
(74) *Attorney, Agent, or Firm* — Finnegan, Henderson, Farabow, Garrett & Dunner, LLP

(57) ABSTRACT

A waste heat recovery system includes an evaporator that evaporates a coolant in a liquid phase by using waste heat from an internal combustion engine, a turbine that rotates by receiving the coolant in a gas phase having passed through the evaporator, a condenser that condenses the coolant in the gas phase having passed through the turbine into the coolant in the liquid phase, and a pump that supplies the coolant in the liquid phase fed from the condenser to the evaporator. The waste heat recovery system further includes a coupling mechanism that constantly couples a rotating shaft of the turbine to a crankshaft of the internal combustion engine, and the crankshaft is directly coupled to a vehicle transmission.

5 Claims, 7 Drawing Sheets

(56) References Cited

U.S. PATENT DOCUMENTS

| | | | | |
|---|---|---|---|---|
| 2014/0150426 A1* | 6/2014 | Rewers | ............... | F01K 23/065 |
| | | | | 60/605.1 |
| 2014/0352301 A1* | 12/2014 | Mueller | ............... | F01K 23/065 |
| | | | | 60/618 |
| 2015/0345340 A1* | 12/2015 | Kubota | ............... | F02C 9/00 |
| | | | | 60/660 |
| 2015/0377077 A1* | 12/2015 | Laboe | ............... | F01K 23/10 |
| | | | | 60/650 |
| 2016/0230607 A1* | 8/2016 | Tanaka | ............... | F02G 5/00 |
| 2017/0067371 A1* | 3/2017 | Hunter | ............... | F01K 23/065 |
| 2018/0119578 A1* | 5/2018 | Zhou | ............... | F01K 15/02 |
| 2018/0252121 A1* | 9/2018 | Kobayashi | ............... | F01D 21/02 |
| 2019/0178110 A1* | 6/2019 | Bagayatkar | ............... | F01N 5/02 |

FOREIGN PATENT DOCUMENTS

| | | |
|---|---|---|
| JP | 2013-047490 A | 3/2013 |
| JP | 2013-151904 A | 8/2013 |
| JP | 2014-231740 | 12/2014 |
| JP | 2016-098704 | 5/2016 |

* cited by examiner

WASTE HEAT RECOVERY SYSTEM

FIELD

The present invention relates to a waste heat recovery system. In particular, it relates to a waste heat recovery system that recovers waste heat from an internal combustion engine based on the Rankine cycle system.

BACKGROUND

JP2010-242518A discloses a conventional technique that relates to a waste heat recovery system that recovers waste heat from an engine, for example. The waste heat recovery system operates as a Rankine cycle system that uses a coolant that recovers waste heat from the main unit of the engine as a working fluid. The waste heat recovery system includes a water jacket in which a coolant passing therethrough recovers waste heat and turns into a vapor, a turbine that generates a motive power from the coolant in the vapor state, and a transmission that transmits the motive power generated by the turbine to a crankshaft at a variable speed. The motive power generated by the turbine is used as an auxiliary motive power for the engine.

Following is a list of patent literatures which the applicant has noticed as related arts of embodiments the present disclosure.

Patent Literature 1: JP2010-242518A
Patent Literature 2: JP2016-098704A

SUMMARY

With the configuration in which the crankshaft of the internal combustion engine is constantly coupled to the rotating shaft of the turbine as in the conventional technique described above, when the rotational speed of the turbine has not reached a rotational speed that provides high turbine efficiency, for example, the rotation of the turbine can be assisted by the torque of the internal combustion engine. In this way, the rotational speed of the turbine can be quickly increased to a rotational speed that provides high efficiency, and thus the efficiency of waste heat recovery can be improved.

However, the configuration in which the crankshaft of the internal combustion engine is constantly coupled to the rotating shaft of the turbine has a problem that, since the turbine constantly rotates with the crankshaft, which is a rotator, the inertial mass of the internal combustion engine is constantly large. In particular, at the time of cranking when the internal combustion engine starts, the problem of energy loss due to the large inertial mass of the internal combustion engine is noticeable.

The present invention has been devised in view of the problems described above, and an object of the present invention is to provide a waste heat recovery system for an internal combustion engine in which a crankshaft of the internal combustion engine and a rotating shaft of a turbine is constantly coupled to each other and that can reduce the energy loss due to the inertial mass while improving the efficiency of waste heat recovery.

To attain the object described above, the present invention is directed to a waste heat recovery system for an internal combustion engine. The waste heat recovery system includes an evaporator that evaporates a coolant in a liquid phase by using waste heat from the internal combustion engine, a turbine that rotates by receiving the coolant in a gas phase having passed through the evaporator, a condenser that condenses the coolant in the gas phase having passed through the turbine into the coolant in the liquid phase, a pump that supplies the coolant in the liquid phase fed from the condenser to the evaporator, and a coupling mechanism that constantly couples a rotating shaft of the turbine to a crankshaft of the internal combustion engine. The crankshaft of the internal combustion engine is directly coupled to a vehicle transmission.

The waste heat recovery system for an internal combustion engine configured as described above may further include a turbine control valve arranged between the turbine and the evaporator, a vacuum pump that feeds the coolant in the gas phase having passed through the turbine to the outside, and a controller that controls the turbine control valve and the vacuum pump. In a period when the turbine control valve is closed, the controller is configured to activate the vacuum pump to set an outlet pressure of the turbine to be lower than a predetermined negative pressure value.

In the waste heat recovery system for an internal combustion engine configured as described above, the coupling mechanism may be configured as a speed increasing device that has a fixed rotational speed ratio, the rotational speed ratio being a ratio of a rotational speed of the rotating shaft of the turbine to a rotational speed of the crankshaft.

In the waste heat recovery system for an internal combustion engine configured as described above, the coupling mechanism may be configured as a transmission capable of changing a rotational speed ratio, the rotational speed ratio being a ratio of a rotational speed of the rotating shaft of the turbine to a rotational speed of the crankshaft. The waste heat recovery system further includes a transmission controller that controls the transmission to change the rotational speed ratio.

When the internal combustion engine starts, the transmission controller may control the transmission to set the rotational speed ratio to be lower than 1.

The transmission controller may calculate the rotational speed ratio at which the rotational speed of the rotating shaft of the turbine reaches a target turbine rotational speed based on the rotational speed of the crankshaft and controls the transmission to achieve the calculated rotational speed ratio.

In the waste heat recovery system for an internal combustion engine configured as described above, the rotating shaft of the turbine is constantly coupled to the crankshaft of the internal combustion engine. Thus, when the rotational speed of the turbine has not reached a rotational speed that provides high efficiency, for example, the rotation of the turbine is assisted by the torque of the internal combustion engine, so that the efficiency of waste heat recovery can be improved. In addition, the above-described waste heat recovery system in which the crankshaft of the internal combustion engine is directly coupled to the vehicle transmission includes no flywheel between the crankshaft and the vehicle transmission, the turbine constantly coupled to the crankshaft can serve the function of the flywheel. In this way, the inertial mass of the internal combustion engine can be reduced, so that the energy loss due to the inertial mass can be reduced while improving the efficiency of waste heat recovery.

DESCRIPTION OF EMBODIMENTS

Figure 1:
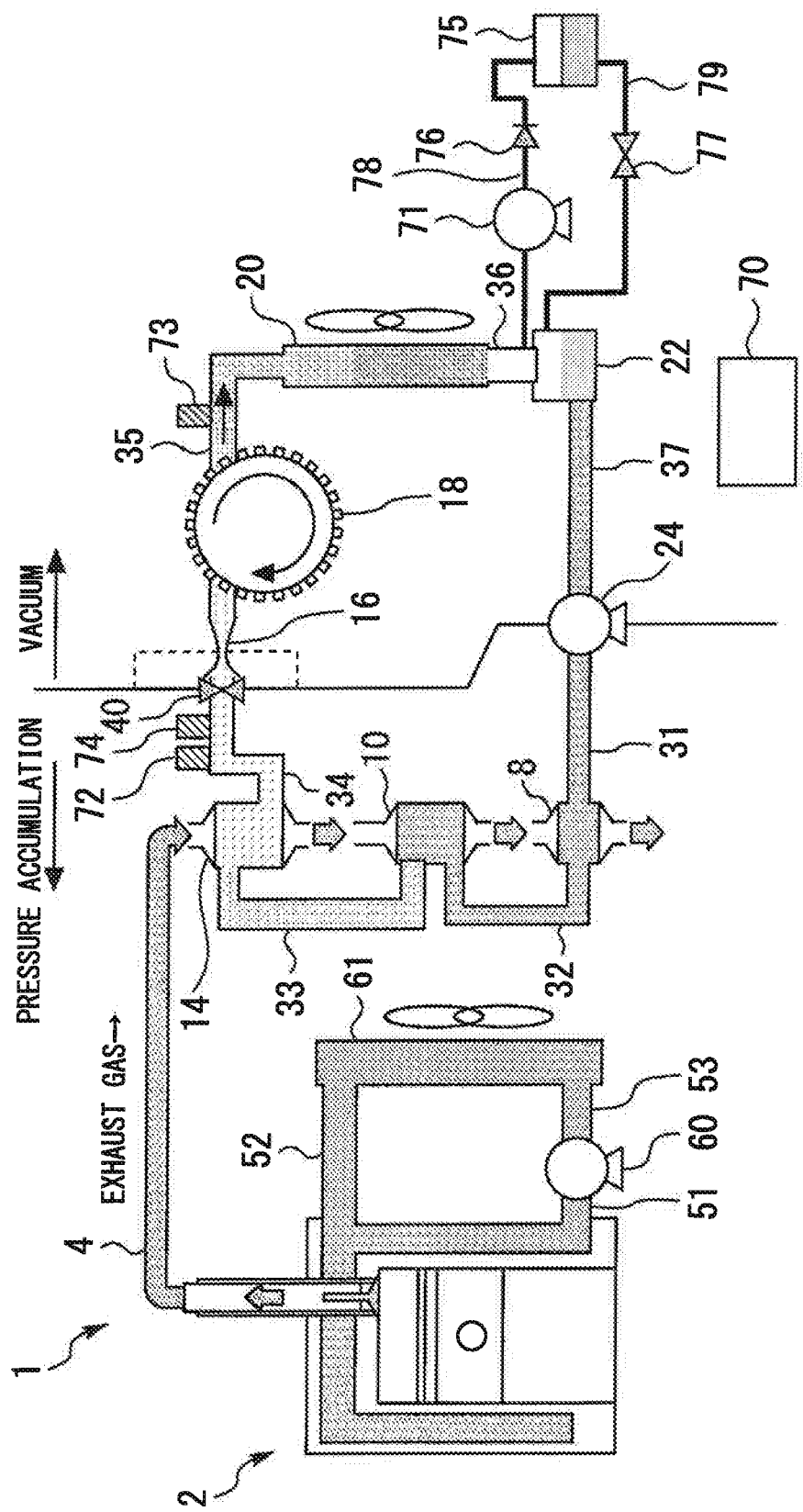
FIG. 1 is a diagram showing a system configuration of a waste heat recovery system according to a first embodiment.

In the following, embodiments of the present invention will be described with reference to the drawings. In the drawings, the same elements are denoted by the same reference numerals, and redundant descriptions thereof will be omitted. Any mention of a numerical value such as the number, quantity, amount or range of an entity in the embodiments described below is not intended to limit the present invention to the numerical value unless otherwise specified or unless it is obvious that the numerical value is identified in principle. In addition, any structure described in the embodiments below is not essential for the present invention unless otherwise specified or unless it is obvious that the structure is identified in principle.

First Embodiment 1-1. Configuration of Waste Heat Recovery System

FIG. 1 is a diagram showing a system configuration of a waste heat recovery system 1 according to a first embodiment. The waste heat recovery system 1 includes an internal combustion engine (also referred to as an engine, hereinafter) 2 of a vehicle. The vehicle is a hybrid vehicle that runs not only on the engine 2 but also on a motor (not shown). Vehicles to which the waste heat recovery system 1 according to the first embodiment can be applied are not limited to hybrid vehicles but include any vehicles that frequently stop and restart the engine, such as an idle-stop vehicle capable of stopping idling.

The waste heat recovery system 1 includes a coolant circuit comprising a plurality of coolant pipes 31, 32, 33, 34, 35, 36 and 37 that are connected in a ring. The coolant circuit is provided with a pump 24 that serves as liquid-phase coolant supply means that feeds a coolant in the liquid phase from the coolant pipe 37 to the coolant pipe 31. The waste heat recovery system 1 causes heat exchange to occur between exhaust gas flowing in an exhaust channel 4 of the engine 2 and the coolant circulating in the coolant circuit to transfer the waste heat of the exhaust gas to the coolant. As the coolant, any substance may be used that is liquid at room temperature and boils or evaporates and changes phase to gas with the heat from the engine 2. In this embodiment, the coolant is water.

Viewed from the downstream side of the flow of the exhaust gas, the exhaust channel 4 is provided with a heater 8, an evaporator 10 serving as a heat exchanger, and a super heater 14. An outlet of a pump 24 is connected to the heater 8 by the coolant pipe 31. The heater 8 causes heat exchange to occur between the exhaust gas flowing in the exhaust channel 4 and the coolant circulating in the coolant circuit to transfer the waste heat of the exhaust gas to the coolant. The heater 8 is connected to the evaporator 10 by the coolant pipe 32. The evaporator 10 is connected to the super heater 14 by the coolant pipe 33. Water fed from the pump 24 absorbs the heat of the exhaust gas in the heater 8 and turns into hot water at a higher temperature. The hot water absorbs the heat of the exhaust gas at a higher temperature in the evaporator 10 to boil or evaporate and turns into steam. The steam absorbs the heat of the exhaust gas at an even higher temperature in the super heater 14 and turns into superheated steam.

The super heater 14 is connected to a turbine 18 by the coolant pipe 34. The turbine 18 serves as an expansion device that causes expansion of the steam fed from the super heater 14 to produce work. A turbine nozzle 16 is provided at the point of connection between the coolant pipe 34 and the turbine 18. The steam is blasted to the turbine 18 through the turbine nozzle 16 to make the turbine 18 rotate. The rotation of the turbine 18 is transmitted to a crankshaft 3 of the engine 2 via a speed increasing device 80 described later. That is, the work produced by the turbine 18 is used to assist the engine 2.

The turbine 18 is connected to the condenser 20 by the coolant pipe 35. The steam expanded in the turbine 18 is cooled to condense in the condenser 20 and turns into liquid water. A catch tank 22 that stores water is arranged vertically below the condenser 20. The condenser 20 is connected to the catch tank 22 by the coolant pipe 36. Water formed by condensation of steam in the condenser 20 is temporarily stored in the catch tank 22. The catch tank 22 is connected to an inlet of the pump 24 by the coolant pipe 37. The water in the catch tank 22 is fed again to the evaporator 10 by the pump 24. The pump 24 is a displacement pump, such as a vane pump.

The waste heat recovery system 1 includes a vacuum pump 71 at a midpoint on a coolant pipe 78 that connects a middle part of the coolant pipe 36 and an upper part of an external tank 75. If there is any water in the gas phase in the coolant pipe 36, the vacuum pump 71 is activated to feed the water in the gas phase to the external tank 75. A check valve 76 is arranged on the coolant pipe 78 between the vacuum pump 71 and the external tank 75 to prevent backflow of water from the external tank 75 to the vacuum pump 71. The water in the gas phase fed to the external tank 75 is cooled by the outside air and turns into water in the liquid phase. The external tank 75 is connected at the bottom thereof to the catch tank 22 by a coolant pipe 79. A tank water level control valve 77 is arranged at a midpoint on the coolant pipe 79. The water level in the external tank 75 is monitored by a water gauge (not shown). When a predetermined water level is reached in the external tank 75, the tank water level control valve 77 is opened to feed the water in the liquid phase from the external tank 75 back to the catch tank 22. In this way, the amount of the coolant circulating in the coolant circuit is maintained. To feed the water in the liquid phase from the external tank 75 back to the catch tank 22, the vacuum pump 71 is activated. This causes the pressure in the external tank 75 to rise so that the water in the liquid phase in the external tank 75 can be fed to the catch tank 22, and no water pump needs to be provided on the coolant pipe 79.

The waste heat recovery system 1 includes a turbine control valve 40 arranged on the coolant pipe 34. The turbine control valve 40 is a control valve that operates in response to a signal from a controller 70 described later.

The waste heat recovery system 1 includes an engine cooling water circuit comprising a plurality of fluid pipes 51, 51 and 53 that are connected in a ring. The engine cooling water circuit is provided with an engine cooling pump 60 that feeds engine cooling water from the fluid pipe 53 to the fluid pipe 51. An outlet of the engine cooling pump 60 is connected to an engine cooling water inlet of the engine 2 by the fluid pipe 51. The engine cooling water inlet of the engine 2 is connected to an inlet of a radiator 61 by the fluid pipe 52. Engine cooling water at a high temperature drawn from the engine 2 is cooled by the radiator 61. An outlet of the radiator 61 is connected to an inlet of the engine cooling pump 60 by the fluid pipe 53. The engine cooling pump 60 is an electric pump that operates in response to a signal from the controller 70 described later.

The waste heat recovery system 1 is provided with a plurality of sensors arranged at various points on the coolant circuit and the engine cooling water circuit. The coolant pipe 34 is provided with a pressure sensor 72 that detects a fore pressure (referred to as a high pressure-side pressure, hereinafter) P1 of the turbine nozzle 16 and a temperature sensor 74 that detects a fore temperature (referred to as a high pressure-side temperature, hereinafter) T1 of the turbine nozzle 16. The coolant pipe 35 is provided with a pressure sensor 73 that detects an outlet pressure (referred to as a low pressure-side pressure, hereinafter) P2 of the turbine 18.

The waste heat recovery system 1 includes the controller 70. The controller 70 comprehensively controls the whole of the waste heat recovery system 1. The controller 70 includes at least an input/output interface, a memory, and a CPU. The input/output interface receives signals from various sensors attached to the waste heat recovery system 1 and outputs operation signals to actuators in the waste heat recovery system 1. The sensors from which the controller 70 receives signals include the pressure sensors 72 and 73 and the temperature sensor 74 described above. The actuators to which the controller 70 outputs operation signals include the pump 24, the engine cooling pump 60, the turbine control valve 40, and the vacuum pump 71 described above. The memory stores various programs, maps or the like for controlling the waste heat recovery system 1. The CPU reads a control program or the like from the memory, executes the program or the like, and produces operation signals based on the received sensor signals. Note that many actuators and sensors other than those shown in the drawing are also connected to the controller 70, although descriptions thereof are omitted herein.

1-2. Configuration of Engine Incorporated in Waste Heat Recovery System

Figure 2:
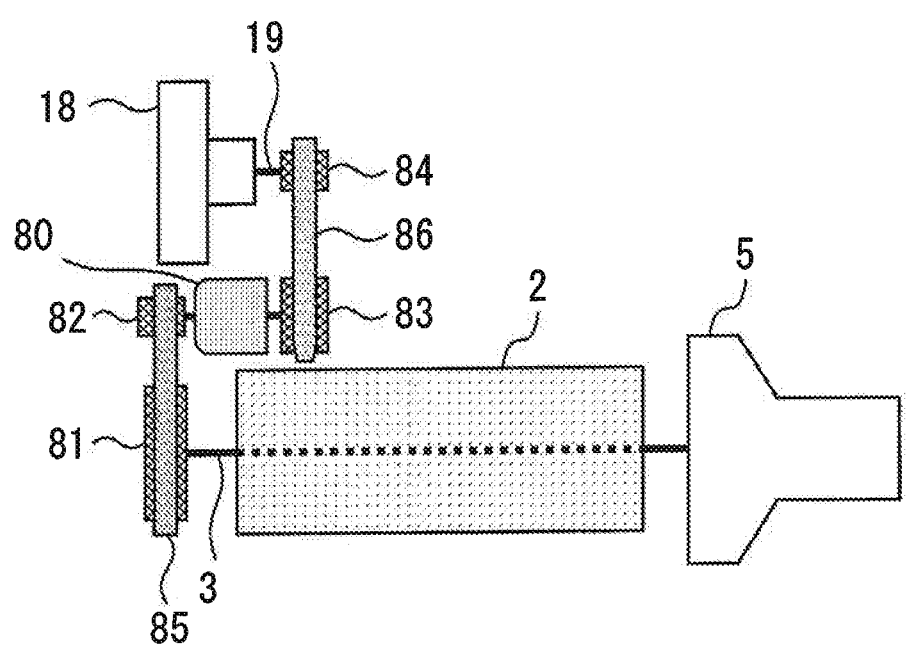
FIG. 2 is a diagram showing a configuration of an engine incorporated in the waste heat recovery system according to the first embodiment.

FIG. 2 is a diagram showing a configuration of the engine incorporated in the waste heat recovery system 1 according to the first embodiment. As shown in this drawing, a rotating shaft 19 of the turbine 18 is constantly coupled to the crankshaft 3 of the engine 2, which is an output shaft of the engine 2, by the speed increasing device 80, which is a coupling mechanism. The speed increasing device 80 includes a plurality of pulleys and a plurality of belts. More specifically, the speed increasing device 80 includes a crank pulley 81, a speed increasing device input pulley 82, a speed increasing device output pulley 83, a turbine pulley 84, and belts 85 and 86. The crank pulley 81 is fixed to the crankshaft 3 so as to rotate integrally therewith. The speed increasing device input pulley 82 and the speed increasing device output pulley 83 are fixed to the same shaft. The turbine pulley 84 is fixed to the rotating shaft 19 of the turbine 18 so as to rotate integrally therewith. The crank pulley 81 is coupled to the speed increasing device input pulley 82 by the belt 85. The speed increasing device output pulley 83 is coupled to the turbine pulley 84 by the belt 86. The speed increasing device 80 in the first embodiment is configured as a coupling mechanism in which the ratio (referred to as a rotational speed ratio, hereinafter) of the rotational speed of the rotating shaft 19 of the turbine 18 (referred to as a turbine rotational speed, hereinafter) to the rotational speed of the crankshaft 3 (referred to as an engine rotational speed, hereinafter) is fixed. In this example, for example, the diameters of the crank pulley 81, the speed increasing device input pulley 82, the speed increasing device output pulley 83 and the turbine pulley 84 are adjusted to set the rotational speed ratio at 10.

A vehicle transmission 5 is coupled to the crankshaft 3 of the engine 2. Note that the crankshaft 3 is directly coupled to the vehicle transmission 5 without a flywheel. That is, the engine 2 in the first embodiment includes no flywheel. Effects and advantages of this configuration will be described in detail later.

1-3. Waste Heat Recovery Control by Waste Heat Recovery System 1

Next, a waste heat recovery control performed by the waste heat recovery system 1 will be described. The waste heat recovery system 1 in the first embodiment activates the Rankine cycle to recover the waste heat from the engine 2 in operation in the form of a rotational energy of the turbine 18. The waste heat recovery system 1 performs the waste heat recovery control by opening the turbine control valve 40 during operation of the engine 2. Water as the coolant in the liquid phase is stored in the evaporator 10. The evaporator 10 receives waste heat from the exhaust gas of the engine 2 to make the water boil. When the water boils, some of the water turns into a coolant in the gas phase (steam). The steam produced in the evaporator 10 is introduced to the super heater 14 through the coolant pipe 33.

The steam produced by phase transition in the evaporator 10 further receives heat from the exhaust gas of the engine 2 when the steam passes through the super heater 14 and thus turns into superheated steam of a higher temperature and a higher pressure. If the turbine control valve 40 is open, the superheated steam having passed through the super heater 14 is introduced to the turbine 18 through the coolant pipe 34. At the turbine 18, the introduced superheated steam is reduced in pressure by the turbine nozzle 16, expands, and then is blasted to the turbine blades. Thus, the thermal energy of the superheated steam is converted into the rotational motion of the turbine 18. The steam reduced in pressure having passed through the turbine 18 is introduced to the condenser 20 through the coolant pipe 35. The steam introduced to the condenser 20 is cooled and turns into water, which is temporarily stored in the catch tank 22 through the coolant pipe 36. The waste heat from the engine 2 is continuously recovered by continuously performing the waste heat recovery operation.

1-4. Characteristic Operation of Waste Heat Recovery System 1

Next, characteristic operations in the waste heat recovery control performed by the waste heat recovery system 1 will be described. Hybrid vehicles frequently stop and restart the engine 2. To increase the efficiency of the waste heat recovery by the waste heat recovery system 1, it is required to increase the rotational speed of the turbine 18 to a rotational speed (20000 rpm/min, for example) that allows efficient waste heat recovery in a limited period in which the engine 2 is operating. However, it takes long for the turbine 18 at rest to rotate at a rotational speed that provides high efficiency only with the superheated steam. A motive power that exceeds the inertial force of the turbine 18 is needed.

The waste heat recovery system 1 in the first embodiment addresses the problem described above by constantly coupling the rotating shaft 19 of the turbine 18 to the crankshaft 3 via the speed increasing device 80. With such a configuration, when the engine 2 starts, the rotation of the crankshaft 3 is constantly transmitted to the rotating shaft 19 of the turbine 18 after the speed of the rotation is increased by the speed increasing device 80. For example, when the rotational speed of the crankshaft 3 rises to 2000 rpm/min, the rotating shaft 19 of the turbine 18 rotates at 20000 rpm/min. Thus, the rotational speed of the turbine 18 can be quickly increased, so that the efficiency of waste heat recovery can be effectively improved.

However, if the rotating shaft 19 of the turbine 18 is constantly coupled to the crankshaft 3, there is a problem that the inertial mass that needs to be moved to rotate the crankshaft 3 increases. The waste heat recovery system 1 in the first embodiment addresses this problem by directly coupling the crankshaft 3 to the vehicle transmission 5 without a flywheel. Owing to the inertial force of the turbine 18 in rotation, the turbine 18 constantly coupled to the crankshaft 3 can constantly serve the functions of the flywheel, such as reducing variations of the rotational speed of the crankshaft 3 or reducing vibrations of the crankshaft 3. Thus, since the system according to the first embodiment is configured with the crankshaft 3 being coupled to the vehicle transmission 5 without a flywheel, the inertial mass that needs to be moved to rotate the crankshaft 3 can be reduced without compromising drivability, and the energy efficiency can be improved.

Although the speed increasing device 80 of the waste heat recovery system 1 in the first embodiment has been described as comprising a plurality of pulleys and belts, a speed increasing device comprising gears can also be used.

Second Embodiment

Next, a waste heat recovery system according to a second embodiment will be described. The waste heat recovery system 1 according to the second embodiment has the same hardware configuration as those shown in FIGS. 1 and 2 but is implemented by the controller 70 executing the control routine shown in FIG. 3 described later.

2-1. Characteristics of Waste Heat Recovery System in Second Embodiment

When the engine 2 starts, the crankshaft 3 rotates, and the turbine 18 coupled to the crankshaft 3 also rotates. The resistance to the blades of the turbine 18 decreases as the degree of vacuum of the interior of the turbine 18 increases. Thus, the waste heat recovery system 1 according to the second embodiment is characterized by a control that brings the interior of the turbine 18 close to vacuum until the Rankine cycle starts and the waste heat recovery control becomes feasible after the engine 2 starts. More specifically, the pump 24 of the waste heat recovery system 1 according to the second embodiment is a displacement pump, the interior of the turbine 18 can be brought close to vacuum by activating the vacuum pump 71 when the turbine control valve 40 is open. Such a control allows the resistance to the turbine to be reduced in the period after the engine 2 starts and until the Rankine cycle normally starts, so that the energy efficiency can be further improved. In the following, specific processings in the control performed in the second embodiment will be described with reference to a flowchart.

Figure 3:
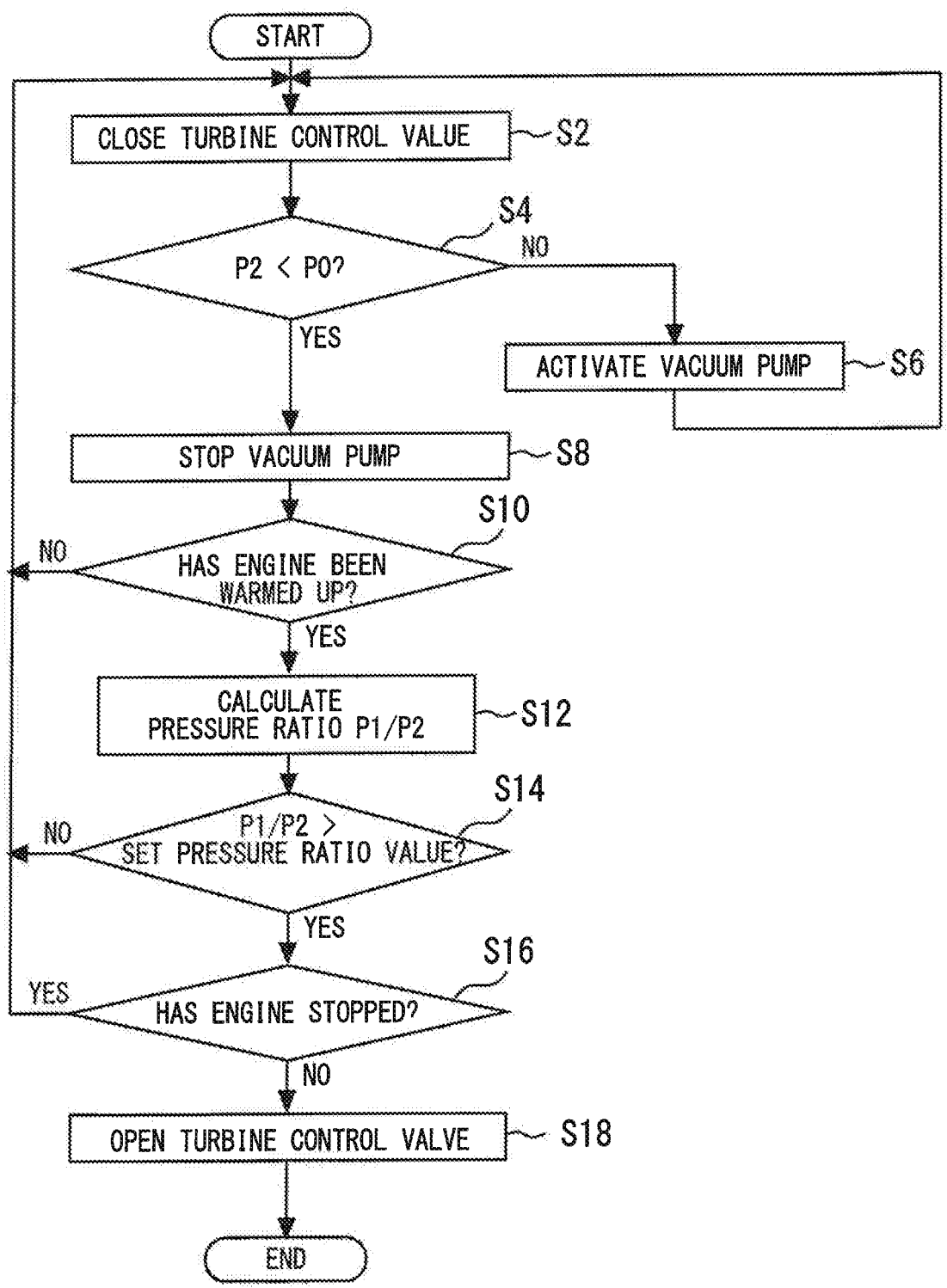
FIG. 3 is a flowchart showing a control routine of a control performed by the waste heat recovery system according to a second embodiment.

2-2. Specific Processings Performed by Waste Heat Recovery System in Second Embodiment FIG. 3 is a flowchart showing a control routine of the control performed by the waste heat recovery system 1 according to the second embodiment. The control routine shown in FIG. 3 is executed by the controller 70 when a request to start the engine 2 is issued.

According to the control routine shown in FIG. 3, the turbine control valve 40 is first closed (Step S2). It is then determined whether the low pressure-side pressure P2 detected by the pressure sensor 73 is lower than a predetermined vacuum pressure set value P0 (Step S4). The vacuum pressure set value P0 is a threshold used to determine whether the resistance to the turbine 18 has decreased to an allowable range or not, and a predetermined negative value (gauge pressure) corresponding to vacuum is read in as the vacuum pressure set value P0.

If the result of the determination in Step S4 is negative, the vacuum pump 71 is activated in the next step (Step S6). After Step S6, the process returns to Step S2. If the result of the determination in Step S4 is affirmative, it is determined that vacuum is generated in the turbine 18, and the vacuum pump 71 is stopped (Step S8).

It is then determined whether warming up of the engine 2 has been completed or not (Step S10). More specifically, it is determined in this step whether the water temperature of the engine 2 has reached a predetermined warmed-up water temperature or not. If the result of the determination is negative, it is determined that the evaporator 10 cannot make water boil, the process proceeds back to Step S2.

If the result of the determination in Step S10 is affirmative, the pressure ratio (P1/P2) between the high pressure-side pressure P1 and the low pressure-side pressure P2 is calculated in the next step (Step S12). It is then determined whether the calculated pressure ratio (P1/P2) is higher than a predetermined set pressure ratio or not (Step S14). The set pressure ratio is a pressure ratio used to determine whether the turbine 18 can be activated by superheated stream or not, and a preset value is read in as the set pressure ratio. If the result of the determination in Step S14 is negative, the process proceeds back to Step S2.

If the result of the determination in Step S14 is affirmative, it is determined whether the engine 2 has stopped or not in the next step (Step S16). If the result of the determination in Step S16 is negative, the turbine control valve 40 is opened in the next step (Step S18). Then, the waste heat recovery control starts.

As described above, the system according to the second embodiment performs the control to set the interior of the turbine 18 under vacuum after the engine 2 starts and until the waste heat recovery operation starts. Thus, the resistance to the turbine 18 can be reduced, and the energy efficiency can be further improved.

Although the system according to the second embodiment has been described as generating vacuum in the turbine 18 by activating the vacuum pump 71 when the turbine control valve 40 is opened, the activation of the vacuum pump 71 is not essential. That is, during operation of the Rankine cycle, the path formed by the turbine nozzle 16, the turbine 18, the coolant pipe 35, the condenser 20, the coolant pipe 36, the catch tank 22, the coolant pipe 37 and the pump 24 is kept at low pressure due to the condensation of the coolant in the condenser 20. Thus, if at least the turbine control valve 40 is closed when the engine 2 stops, the interior of the turbine 18 can be maintained at low pressure without activating the vacuum pump 71 when the engine 2 is started next time.

Third Embodiment

Next, a waste heat recovery system according to a third embodiment will be described. The waste heat recovery system 1 according to the third embodiment has the hardware configurations shown in FIG. 1 and FIG. 4 described later and is implemented by the controller 70 executing the control routine shown in FIG. 8 described later.

Figure 4:
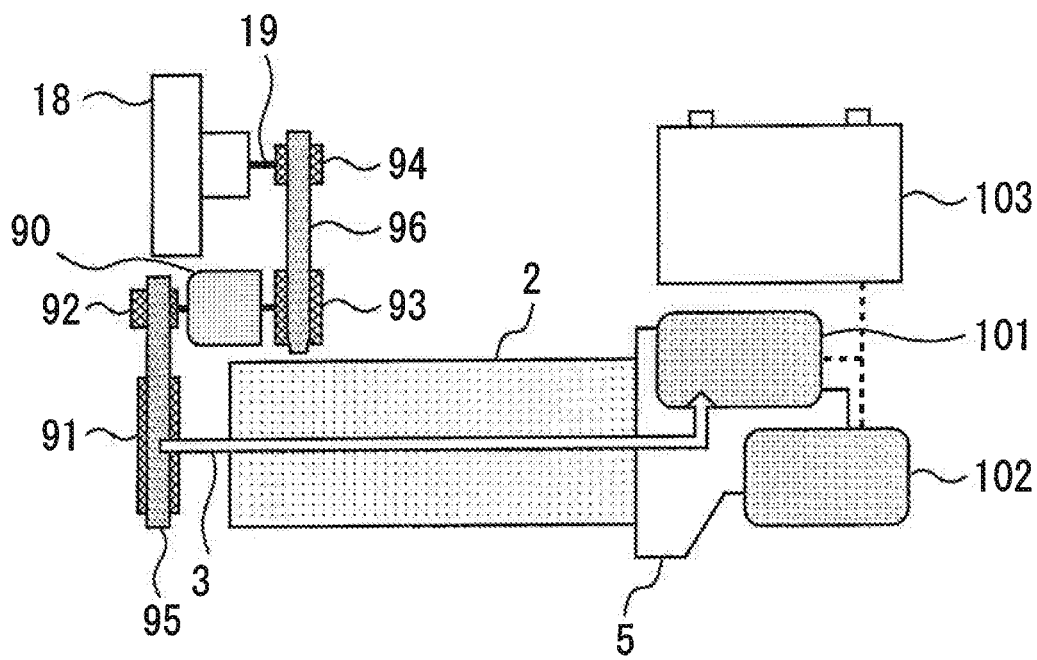
FIG. 4 is a diagram showing a configuration of an engine incorporated in a waste heat recovery system according to a third embodiment.

3-1. Characteristics of Configuration of Waste Heat Recovery System in Third Embodiment FIG. 4 is a diagram showing a configuration of an engine incorporated in the waste heat recovery system 1 according to the third embodiment. The engine shown in FIG. 4 has essentially the same configuration as the engine shown in FIG. 2 except that the speed increasing device 80 serving as a coupling mechanism is replaced with a transmission 90, and FIG. 4 also expressly shows some of the components of the hybrid vehicle. As shown in FIG. 4, the engine includes a first motor generator 101, a second motor generator 102, and a hybrid battery 103. The first motor generator 101 is a motor primarily used to start the engine 2, and the second motor generator 102 is a motor primarily used for the vehicle to run. The motor generators 101 and 102 are electrically connected to the hybrid battery 103 and are configured to be able to receive electric power from the hybrid battery 103 and store electricity in the hybrid battery 103.

The rotating shaft 19 of the turbine 18 is constantly coupled to the crankshaft 3 of the engine 2, which is an output shaft of the engine 2, by the transmission 90, which is a coupling mechanism. The transmission 90 is a coupling mechanism capable of changing the rotational speed ratio. The transmission 90 a crank pulley 91, a transmission input pulley 92, a transmission output pulley 93, a turbine pulley 94, and belts 95 and 96. The crank pulley 91 is fixed to the crankshaft 3 so as to rotate integrally therewith. The transmission input pulley 92 and the transmission output pulley 93 are fixed to the same shaft. The turbine pulley 94 is fixed to the rotating shaft 19 of the turbine 18 so as to rotate integrally therewith. The crank pulley 91 is coupled to the transmission input pulley 92 by the belt 95. The transmission output pulley 93 is coupled to the turbine pulley 94 by the belt 96. The crank pulley 91 is configured to be able to change the effective pulley diameter by operating an actuator (not shown). The controller 70 also serves the function of a transmission controller that controls the transmission 90 to change the rotational speed ratio. The configuration of the transmission 90 is not limited to that described above, and any other transmissions having well-known configurations for changing the rotational speed ratio can be used.

3-2. Characteristic Operation of Waste Heat Recovery System in Third Embodiment

Figure 5:
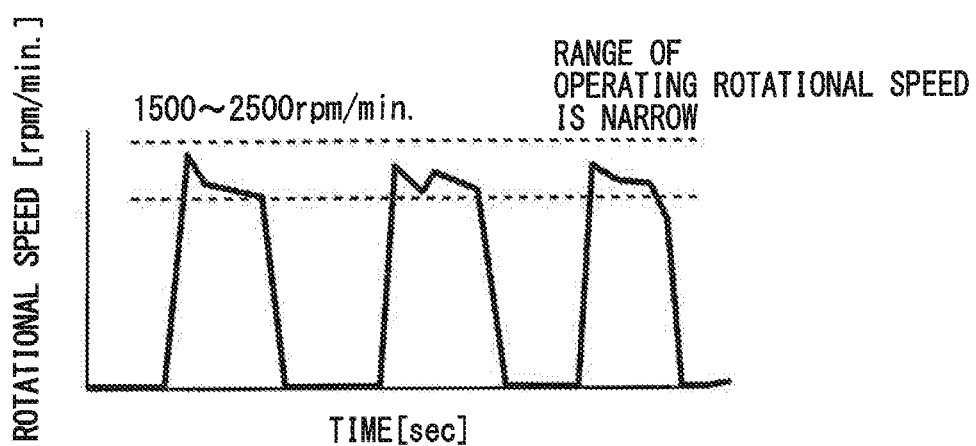
FIG. 5 is a graph showing an example of a temporal variation of a rotational speed of an engine mounted on a hybrid vehicle.
Figure 6:
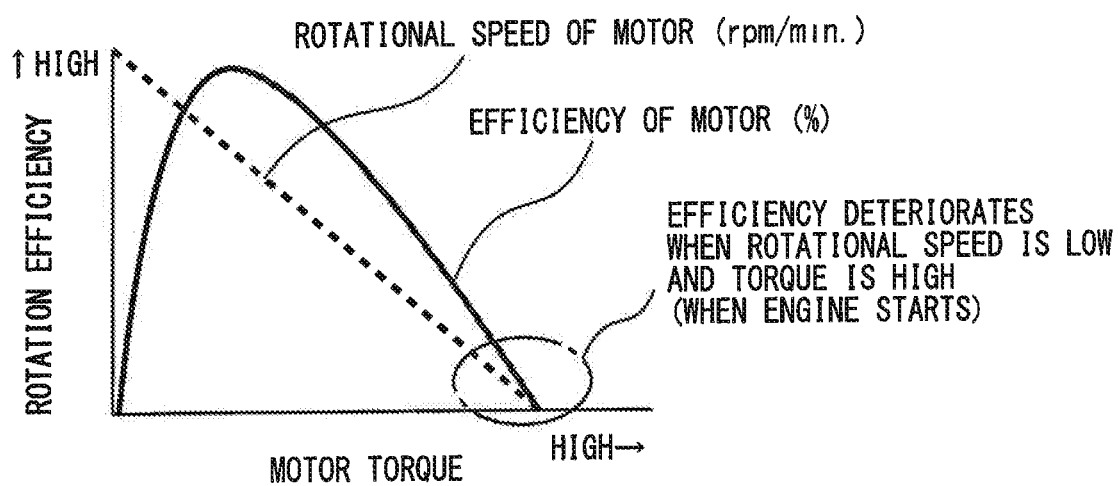
FIG. 6 is a diagram showing output characteristics of a motor generator.

Next, characteristic operations in the waste heat recovery control performed by the waste heat recovery system 1 according to the third embodiment will be described. FIG. 5 is a graph showing an example of a temporal variation of the rotational speed of the engine mounted on a hybrid vehicle. As shown in FIG. 5, the hybrid vehicle experiences frequent starts and stops of the engine in response to a request for acceleration of the vehicle or a request for storage of electricity in the hybrid battery 103, for example. In addition, the hybrid vehicle is characterized in that the rotational speed of the engine is quickly increased when the engine starts, and after that, the engine runs in a narrow rotational speed range (a range from 1500 to 2500 rpm/min, for example). The first motor generator 101 is used to start (crank up) the engine of the hybrid vehicle. FIG. 6 is a diagram showing output characteristics of the motor generator. As shown in FIG. 6, the motor generator is characterized in that the rotation efficiency is low when the required torque is high and the rotational speed of the motor is low, such as when starting the engine. If the rotational speed ratio is fixed at a high value (10, for example) as with the speed increasing device 80 in the first embodiment, the torque required to rotate the turbine 18 at rest is too high, and there arises a problem that the electric power consumption and thus the fuel consumption deteriorate.

To address this problem, the waste heat recovery system 1 according to the third embodiment adopts the transmission 90 capable of changing the rotational speed ratio to improve the energy efficiency in the period after the engine 2 starts and until the engine 2 stops. More specifically, when the engine 2 starts (is cranked up), the rotational speed ratio is kept to be lower than 1. In addition, in a steady period in which the rotational speed of the engine 2 does not significantly vary, the rotational speed ratio is adjusted to reduce the variation of the turbine rotational speed. In the following, a specific rotational speed control for the transmission 90 will be described with reference to FIG. 7.

Figure 7:
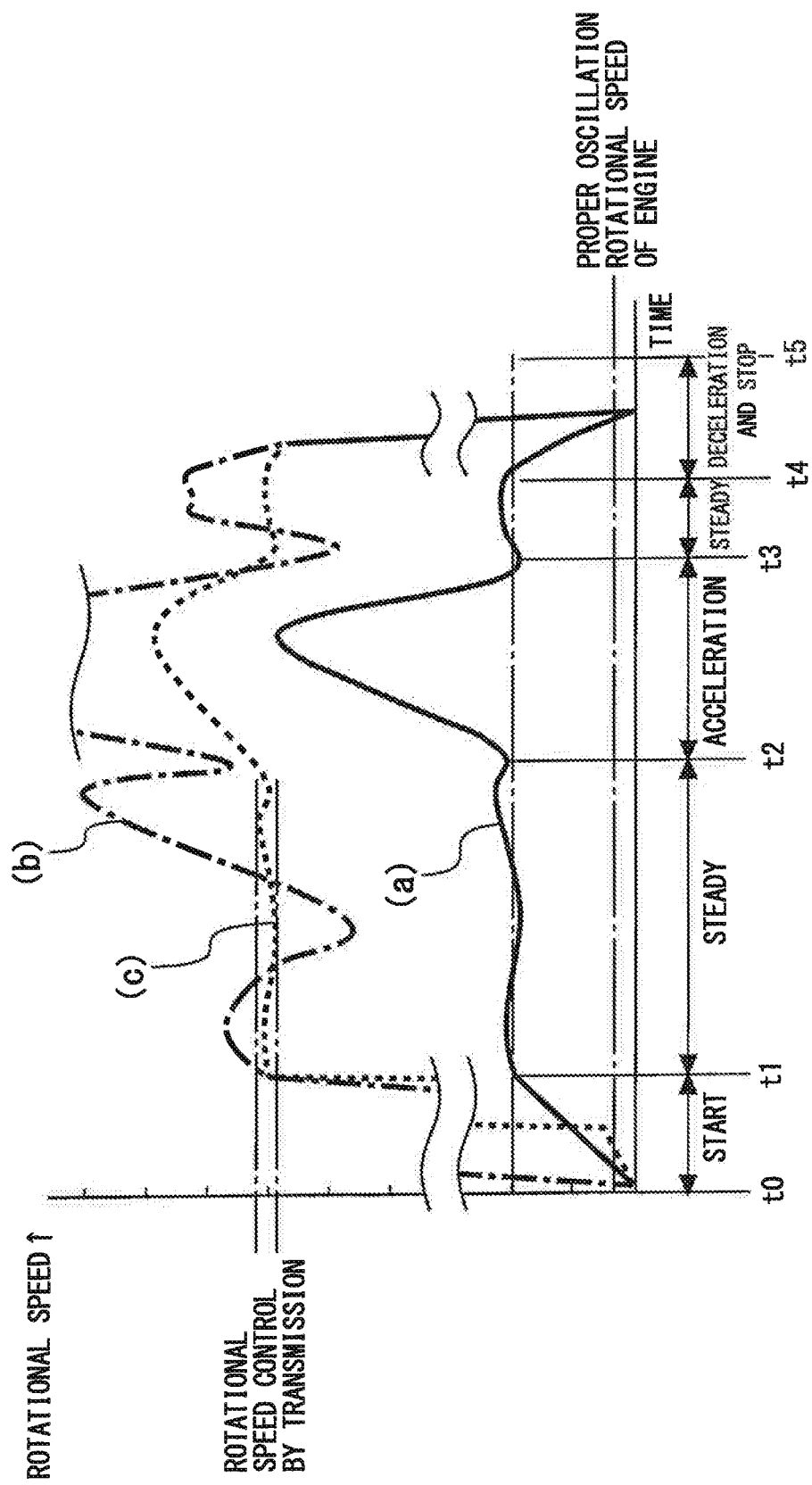
FIG. 7 is an example of a time chart showing variations of an engine rotational speed and a turbine rotational speed in a period after the engine starts and until the engine stops.

FIG. 7 is an example of a time chart showing variations of the engine rotational speed and the turbine rotational speed in the period after the engine starts and until the engine stops. In this drawing, the graph (a) shows variations of the engine rotational speed, the graph (b) shows variations of the turbine rotational speed in the waste heat recovery system 1 according to the first embodiment that includes the speed increasing device 80, and the graph (c) shows variations of the turbine rotational speed in the waste heat recovery system 1 according to the third embodiment that includes the transmission 90.

In FIG. 7, the period from a time t0 to a time t1 is a period in which the engine 2 starts. In this period, first, the rotational speed ratio is fixed at a starting rotational speed ratio when the engine 2 is cranked up. The starting rotational speed ratio is set at a value smaller than 1, so that the turbine rotational speed is lower than the engine rotational speed. In the example shown in this drawing, the starting rotational speed ratio is set at 0.33. Thus, the torque required for cranking of the engine 2 an be reduced, and the efficiency deterioration of the motor used for cranking can be reduced.

Once the engine 2 starts, the engine rotational speed rises toward a target rotational speed (2000 rpm/min, for example) in a steady operation. The turbine rotational speed is preferably kept at a rotational speed (20000 rpm/min, for example) that provides the highest efficiency when the engine rotational speed reaches the target rotational speed. Thus, in the example shown in the time chart of FIG. 7, after the turbine rotational speed exceeds a proper oscillation rotational speed of the engine 2, the rotational speed ratio is increased toward a target ratio (10, in this example). Thus, the inertial mass is kept low to shorten the time required to pass through the range of rotational speeds that poses the problem of vibrations until the proper oscillation rotational speed of the engine 2 is reached, whereas the rotational speed ratio is gradually increased to quickly increase the turbine rotational speed after the proper oscillation rotational speed is exceeded.

In FIG. 7, the period from the time t1 to a time t2 is a steady period in which the engine runs at an engine rotational speed close to the target engine rotational speed of 2000 rpm/min. The turbine rotational speed in the steady period is preferably kept at the rotational speed that provides the highest efficiency. However, the rotational speed ratio in the steady period is set at a high value (10, for example). Therefore, with the speed increasing device 80 having a fixed rotational speed ratio in the first embodiment, the turbine rotational speed significantly varies in response to a small variation of the engine rotational speed, as shown by the graph (b) in the drawing.

The waste heat recovery system 1 according to the third embodiment controls the rotational speed ratio to reduce the variations of the turbine rotational speed in the steady period. In the example shown in FIG. 7, for example, the rotational speed ratio is reduced to 9.57 when the engine rotational speed in the steady period increases to 2100 rpm/min, the rotational speed ratio is increased to 10.57 when the engine rotational speed decreases to 1900 rpm/min, and the rotational speed ratio is reduced to 9.14 when the engine rotational speed increases to 2200 rpm/min. As a result, the variation of the turbine rotational speed in the steady period is reduced to fall within a range from 19900 rpm/min to 20100 rpm/min. Thus, the turbine efficiency can be kept high in the steady period, and the efficiency of waste heat recovery can be improved.

In FIG. 7, the period from the time t2 to a time t3 is an acceleration period in which the engine rotational speed increases. In this period, the rotational speed ratio is reduced to prevent overspeed of the turbine due to the increase of the engine rotational speed. In the example shown in FIG. 7, the rotational speed ratio in the acceleration period is reduced to 4.

In FIG. 7, the period from the time t3 to a time t4 is a steady period similar to the period from the time t1 to the time t2. In this period, the same operation as in the steady period described above occurs. In FIG. 7, the period from the time t4 to a time t5 is a deceleration and stop period in which the engine 2 decelerates and stops. In this period, the rotational speed ratio is gradually reduced to be ready for the next start of the engine. In the example shown in FIG. 7, the rotational speed ratio is reduced to 0.33 when the engine 2 stops.

As described above, the waste heat recovery system 1 according to the third embodiment can attain a target turbine rotational speed (referred to as a target turbine rotational speed, hereinafter) by adjusting the rotational speed ratio to reduce the variations of the turbine rotational speed. Although the target turbine rotational speed would otherwise be preferably set at a rotational speed that provides the highest turbine efficiency, it is also required that the minimum inertial force required for the turbine 18 to serve as a flywheel acts on the turbine 18. Thus, the target turbine rotational speed is preferably set at a value that satisfies both the requirements. In the following, specific processings in the rotational speed control of the transmission 90 including determination of the target turbine rotational speed will be described with reference to a flowchart.

Figure 8:
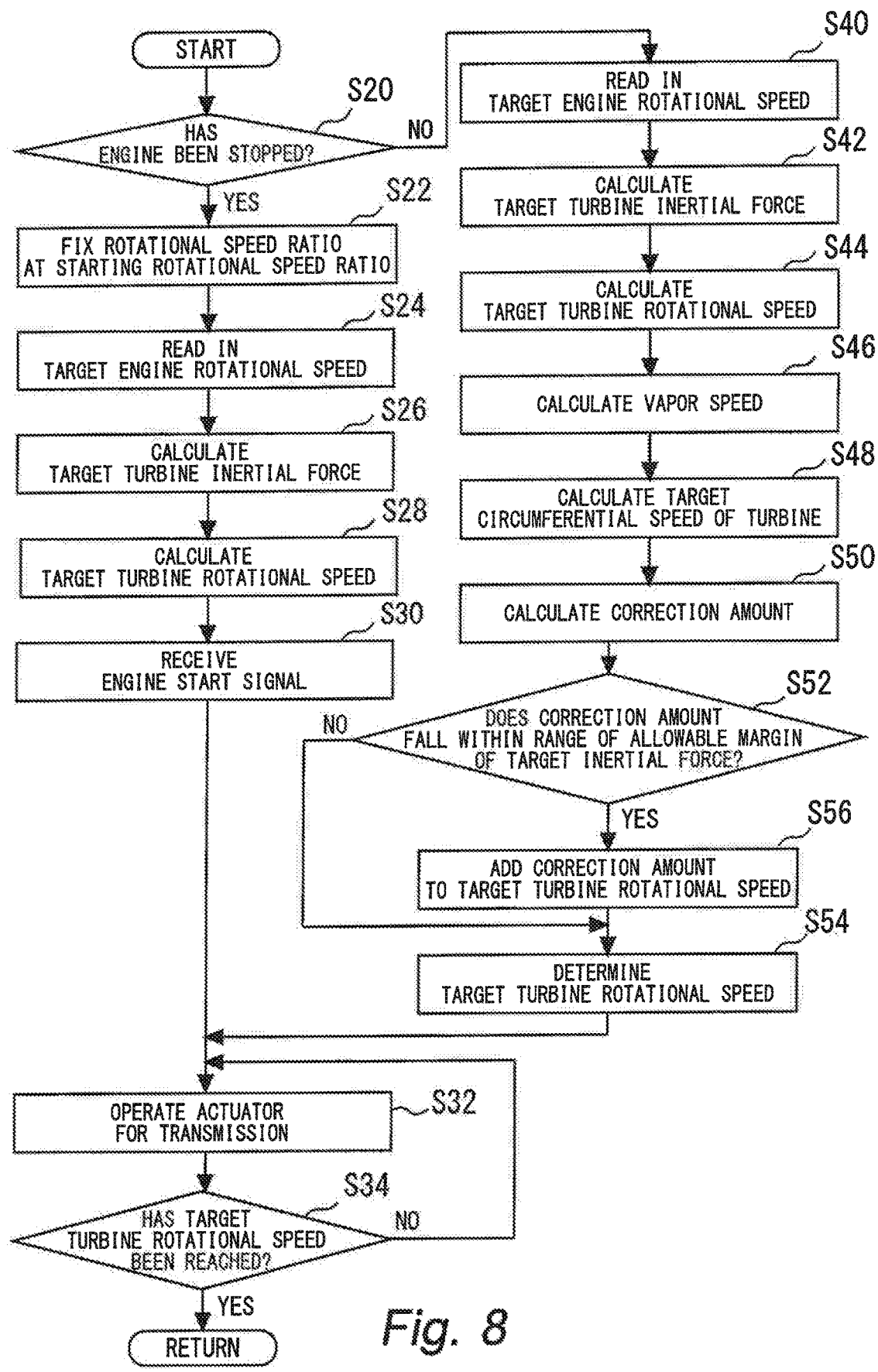
FIG. 8 is a flowchart showing a control routine of a rotational speed control of a transmission performed by the waste heat recovery system according to the third embodiment.

3-3. Specific Processings Performed by Waste Heat Recovery System in Third Embodiment FIG. 8 is a flowchart showing a control routine of the rotational speed control of the transmission 90 performed by the waste heat recovery system 1 according to the third embodiment. The control routine shown in FIG. 8 is repeatedly executed by the controller 70 when the hybrid vehicle is running.

According to the control routine shown in FIG. 8, it is first determined whether the engine 2 is stopped or not (Step S20). If the result of the determination is affirmative, the rotational speed ratio is fixed at the starting rotational speed ratio (0.33, for example) so that the turbine rotational speed is lower than the engine rotational speed (Step S22).

The target engine rotational speed is then read in (Step S24). The target engine rotational speed is a target value of the rotational speed of the engine 2 at the time of start of the engine 2 and is determined (2000 rpm/min, for example) depending on the operational condition or the like of the vehicle. A target turbine inertial force is then calculated (Step S26). The target turbine inertial force is a target value of the inertial force required for the turbine 18 to serve the function of the flywheel and is determined based on the target engine rotational speed or the like.

The target turbine rotational speed at the time when the target turbine inertial force acts on the turbine 18 is then calculated (Step S28). An engine start signal is then received (Step S30). At this point in time, the rotational speed ratio is fixed at the starting rotational speed ratio set in Step S22 described above. Once the engine 2 starts, the engine rotational speed is controlled to be the target engine rotational speed. An actuator for the transmission 90 is then operated to set the turbine rotational speed at the target turbine rotational speed (Step S32). More specifically, based on the detected engine rotational speed, the rotational speed ratio at which the turbine rotational speed reaches the target turbine rotational speed is calculated. The actuator for the transmission 90 is then operated to achieve the calculated rotational speed ratio.

It is then determined whether the turbine rotational speed has reached the target turbine rotational speed or not (Step S34). If it is determined that the turbine rotational speed has not reached the target turbine rotational speed, the process proceeds back to Step S32, and the actuator for the transmission 90 is operated again. If it is determined that the turbine rotational speed has reached the target turbine rotational speed, the process returns to the start of this routine.

If the result of the determination in Step S20 is negative, it is determined that the engine 2 has already started, and the target engine rotational speed is read in (Step S40). In this example, the target engine rotational speed determined depending on the operational condition or the like of the vehicle is read in. The target turbine inertial force is then calculated (Step S42). In this example, the same processing as that in Step S26 is performed. The target turbine rotational speed is then calculated (Step S44). In this example, the same processing as that in Step S28 is performed.

In steps S46 to S56, a procedure of correcting the target turbine rotational speed based on the amount of vapor in the turbine 18 is performed. More specifically, first, the speed of the vapor ejected from the outlet of the turbine nozzle 16 is calculated from the detected high pressure-side pressure P1, high pressure-side temperature T1 and low pressure-side pressure P2 (Step S46). A target value of the circumferential speed of the turbine 18 (referred to as a target turbine circumferential speed, hereinafter) is then calculated based on the target turbine rotational speed calculated in Step S44 described above (Step S48). As a correction amount, the difference between the vapor speed calculated in Step S46 described above and the target turbine circumferential speed calculated in Step S48 is then calculated (Step S50).

It is determined whether the correction amount calculated in Step S50 described above falls within a range of an allowable margin of the target inertial force or not (Step S52). The allowable margin of the target inertial force is an increment or decrement of the turbine rotational speed that corresponds to the range of the target inertial force allowable from the viewpoint of the vibration of the engine 2 or the like, and a preset value is read in. If the result of the determination is negative, it can be determined that the target inertial force cannot be maintained in the allowable range. In that case, the target turbine rotational speed calculated in Step S44 described above is designated as the final target turbine rotational speed without taking into account the calculated correction amount (Step S54).

If the result of the determination in Step S52 described above is affirmative, it can be determined that the target inertial force can be maintained in the allowable range even if the target turbine rotational speed is corrected to a rotational speed that provides a better turbine efficiency based on the amount of vapor. In that case, the correction amount calculated in Step S50 described above is added to the target turbine rotational speed calculated in Step S44 in the next step (Step S56). The process then proceeds to Step S54, in which the target turbine rotational speed calculated in Step S56 described above is designated as the final target turbine rotational speed.

After the processing in Step S54 is performed, the process proceeds to Step S32, in which the actuator for the transmission 90 is operated to set the turbine rotational speed at the target turbine rotational speed. More specifically, based on the detected engine rotational speed, the rotational speed ratio at which the turbine rotational speed reaches the target turbine rotational speed is calculated. The actuator for the transmission 90 is then operated to achieve the calculated rotational speed ratio. In the following Step S34, it is determined whether the turbine rotational speed has reached the target turbine rotational speed or not. If it is determined that the turbine rotational speed has not reached the target turbine rotational speed, the process proceeds back to Step S32, and the actuator for the transmission 90 is operated again. If it is determined that the turbine rotational speed has reached the target turbine rotational speed, the process returns to the start of this routine.

As described above, the waste heat recovery system 1 according to the third embodiment controls the rotational speed ratio of the transmission 90 depending on the operational condition of the engine 2. As a result, the inertial mass can be reduced at the time of cranking, so that deterioration of the efficiency of the motor can be prevented. In addition, the system according to the third embodiment determines the target turbine rotational speed that provides an improved turbine efficiency within the allowable range of the inertial force of the turbine 18, so that the efficiency of waste heat recovery can be improved while reducing the energy loss due to the inertial mass. In addition, the variations of the turbine rotational speed in the steady period can be reduced, so that the turbine efficiency can be kept high to improve the efficiency of waste heat recovery.

The method of determining the target turbine rotational speed is not limited to that described above. That is, an optimal value can be determined as appropriate based on both requirements of efficiency and inertial force of the turbine 18.

Furthermore, the waste heat recovery system 1 according to the third embodiment may also be configured to perform the control performed by the waste heat recovery system 1 according to the second embodiment described earlier.

What is claimed is:

1. A waste heat recovery system for an internal combustion engine, comprising:
    an evaporator that evaporates a coolant in a liquid phase by using waste heat from the internal combustion engine;
    a turbine that rotates by receiving the coolant in a gas phase having passed through the evaporator;
    a condenser that condenses the coolant in the gas phase having passed through the turbine into the coolant in the liquid phase;
    a pump that supplies the coolant in the liquid phase fed from the condenser to the evaporator;
    a turbine control valve arranged between the turbine and the evaporator;
    a vacuum pump that feeds the coolant in the gas phase having passed through the turbine to an external tank;
    a controller that controls the turbine control valve and the vacuum pump,
    wherein, in a period when the turbine control valve is closed, the controller is configured to activate the vacuum pump to set an outlet pressure of the turbine to be lower than a predetermined negative pressure value; and
    a coupling mechanism that constantly couples a rotating shaft of the turbine to a crankshaft of the internal combustion engine,
    wherein the crankshaft is directly coupled to a vehicle transmission.

2. The waste heat recovery system for an internal combustion engine according to claim 1, wherein the coupling mechanism is a speed increasing device that has a fixed rotational speed ratio, the rotational speed ratio being a ratio of a rotational speed of the rotating shaft of the turbine to a rotational speed of the crankshaft.

3. The waste heat recovery system for an internal combustion engine according to claim 1, wherein the coupling mechanism is a transmission capable of changing a rotational speed ratio, the rotational speed ratio being a ratio of a rotational speed of the rotating shaft of the turbine to a rotational speed of the crankshaft, and
    the waste heat recovery system further comprises a transmission controller that controls the transmission to change the rotational speed ratio.

4. The waste heat recovery system for an internal combustion engine according to claim 3, wherein, when the internal combustion engine starts, the transmission controller controls the transmission to set the rotational speed ratio to be lower than 1.

5. The waste heat recovery system for an internal combustion engine according to claim 3, wherein the transmission controller is configured to calculate the rotational speed ratio at which the rotational speed of the rotating shaft of the turbine reaches a target turbine rotational speed based on the rotational speed of the crankshaft and control the transmission to achieve the calculated rotational speed ratio.

* * * * *